UNITED STATES PATENT OFFICE.

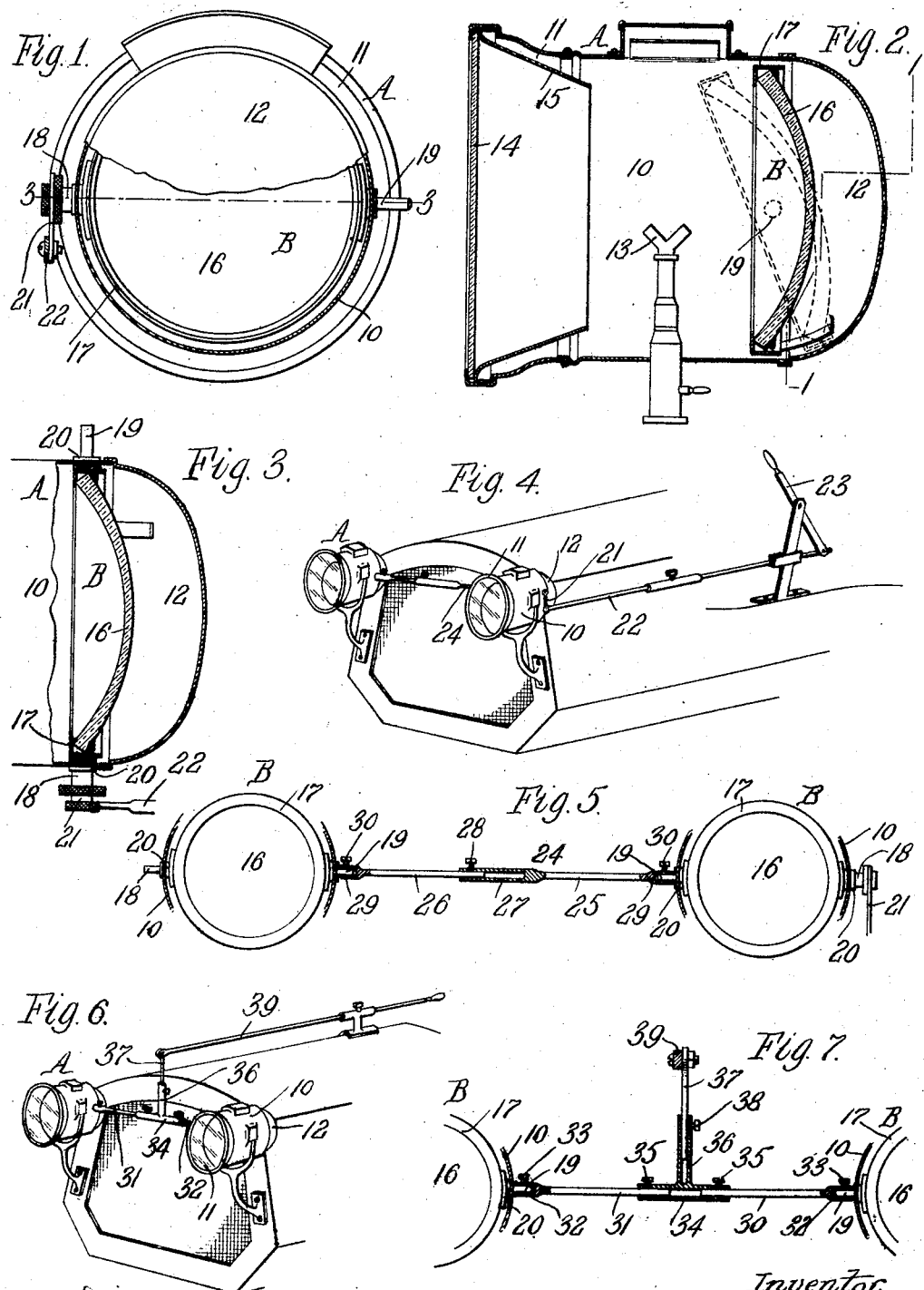

CHARLES L. BETTS, OF NEW YORK, N. Y., ASSIGNOR TO R. E. DIETZ COMPANY, OF NEW YORK, N. Y.

HEADLIGHT.

933,614.   Specification of Letters Patent.   Patented Sept. 7, 1909.

Application filed April 23, 1908. Serial No. 428,862.

*To all whom it may concern:*

Be it known that I, CHARLES L. BETTS, a citizen of the United States, residing at New York, borough of Brooklyn, in the county of Kings and State of New York, have invented a new and useful Improvement in Headlights, of which the following is a specification.

This invention relates to that class of headlight which are used on vehicles, particularly automobiles, and has for its object to provide such headlights with means for quickly and conveniently changing the forward reflection of light so that the full reflecting power can be had when required, for instance, when running on a dark road, while the reflection can be quickly diminished when running on a lighted street, where the full reflection is objectionable by reason of the blinding glare.

In the accompanying drawings: Figure 1 is a fragmentary transverse section of a headlight provided with this improvement, in line 1—1, Fig. 2. Fig. 2 is a longitudinal vertical section thereof. Fig. 3 is a horizontal section through the rear portion of the headlight, in line 3—3, Fig. 1. Fig. 4 is a perspective view of the front portion of an automobile provided with two of these headlights connected by an adjusting mechanism arranged on one side. Fig. 5 is a sectional elevation, on an enlarged scale, of those parts of the adjusting mechanism which connect the two headlights. Fig. 6 is a perspective view, showing two headlights connected by an adjusting mechanism arranged centrally. Fig. 7 is a sectional elevation, on an enlarged scale, of those parts of the adjusting mechanism which connect the two headlights shown in Fig. 6.

Like reference characters refer to like parts in the several figures.

A represents the shell or casing of the headlight which may be of any desired form and which is shown as comprising a horizontal cylindrical body 10, a flaring front 11 and a closed back 12.

13 represents an acetylene burner or other suitable source of light secured within the body 10 of the shell in any suitable manner.

14 represents the front glass or lens and 15 the front reflector secured within the front portion of the shell and having the form of a forwardly flaring truncated cone.

B represents the rear reflector arranged within the rear portion of the shell and comprising a shallow concave glass reflector 16 and an annular metallic frame 17 in which the glass is secured. This reflector is pivoted to the shell on a transverse axis passing centrally through the shell, so that the reflector can be tilted or inclined on the axis. When the reflector is in its normal upright position, represented in Fig. 2 in full lines, the optical axis of the rear reflector B, and front reflector 15 coincide and the full power of the forward reflection is secured. When the rear reflector is tilted or inclined on its horizontal axis, as shown in dotted lines in Fig. 2, its optical axis is deflected downwardly and the reflecting power of the headlight is greatly diminished. The reflecting power of the front reflector and the direct forward illumination furnished by the flame or other light remains undisturbed, but the forward reflection of the rear reflector is greatly reduced and directed mainly upon the ground, whereby the disturbing glare of the ordinary headlight is obviated. The rear reflector is pivoted to the shell by transverse trunnions or journals 18 19 which project horizontally from the sides of the reflector and turn in sockets or bearings 20 on the sides of the shell. When two such headlights are arranged side by side on an automobile, as represented in Figs. 4 and 6, it is desirable to adjust the rear reflectors of both headlights simultaneously. For that purpose an adjusting mechanism is provided which connects with the rear reflectors of the two headlights.

In the construction represented in Figs. 4 and 5 the outside trunnion 18 of one of the rear reflectors B is provided outside of the shell with an arm 21, Figs. 1 and 4, to which is connected the front end of a longitudinal adjusting rod 22 terminating in convenient reach of the driver, where the rod may be connected with a hand lever 23, so that by means of this lever the adjusting rod can be moved backwardly and forwardly, thereby shifting the reflector. The inner trunnion 19 of this reflector is connected with the inner trunnion of the rear reflector of the companion headlight by a transverse rod 24, Figs. 4 and 5, connected with the trunnions by any suitable means which will cause both reflectors to rock on their trunnions simultaneously. In the construction represented in Figs. 4 and 5 the inner trunnions 19 are connected by an extensible rod composed of two members 25 26 which are connected by a socket 27 and set screw 28 and which each have at their outer ends a socket 29 which engages the trunnion and is secured thereto by a set screw 30.

In the construction represented in Figs. 6 and 7, the inner trunnions 19 are connected by an extensible rod composed of two members 30 and 31, each provided at its outer end with a socket 32 and set screw 33 for the trunnion and connected at their inner ends with the transversely arranged socket or hub 34 of a lever arm to which the members of the rod are secured by set screws 35. This lever arm is preferably extensible, as shown, by means of an upright socket 36 formed on the transverse socket 34 and receiving the upper member 37 of the arm which is secured in the socket 36 by a set screw 38. The upper end of this lever arm is connected with a centrally arranged adjusting rod 39.

In the normal position of the movable rear reflector its optical axis is in line with the optical axis of the fixed front reflector and a powerful forward reflection is secured, which is resorted to when necessary, as, for instance, when running on an unlighted road. Upon tilting the rear reflector, the latter is rendered ineffective to a large extent and the forward illumination is furnished mainly by the direct light of the flame or other source of light and the front reflector, which illumination is sufficient for running on lighted streets or roads. Either the full forward illumination or the partial illumination can be quickly secured by means of the adjusting mechanism under control of the driver.

I claim as my invention:

1. The combination with a headlight casing, a stationary front reflector arranged therein, a source of light arranged within the casing in rear of said front reflector, a movable rear reflector arranged in rear of said source of light and having a pivotal support on which the rear reflector can be shifted bodily to place its optical axis at an angle to that of the front reflector, and adjusting means arranged outside of said casing and connected with the rear reflector, substantially as set forth.

2. The combination with a stationary headlight casing, a stationary forwardly flaring front reflector arranged therein, a source of light arranged within the casing in rear of said front reflector, a movable rear reflector arranged in rear of said source of light and having a pivotal support on which the rear reflector can be shifted bodily to place its optical axis at an angle to that of the front reflector, and adjusting means arranged outside of said casing and connected with the rear reflector, substantially as set forth.

3. The combination with two stationary headlight casings, each provided with a front glass for the emission of light forwardly and with a source of light, of a pivotally mounted reflector arranged in each casing in rear of the source of light, and a shifting mechanism outside of said casings which controls the position of both reflectors, substantially as set forth.

4. The combination of two stationary headlight casings arranged side by side and each provided with a front glass for the emission of light forwardly and with a source of light, of a pivotally mounted reflector arranged in each casing in rear of the source of light, and a shifting mechanism outside of said casings which connects both reflectors and adjusts the same simultaneously, substantially as set forth.

5. The combination of two stationary headlight casings, each provided with a front glass for the emission of light forwardly and with a source of light, of a pivotally mounted reflector arranged in each casing in rear of the source of light, a transverse rod connecting the reflectors and causing both to tilt simultaneously, and a longitudinal adjusting rod extending from said transverse rod rearwardly, substantially as set forth.

Witness my hand in the presence of two subscribing witnesses.

CHARLES L. BETTS.

Witnesses:
E. R. DE TAMBLE,
E. D. PRICE.